United States Patent
Griffin

(10) Patent No.: US 11,695,570 B1
(45) Date of Patent: *Jul. 4, 2023

(54) QUANTUM-SAFE BLOCKCHAIN VAULT SYSTEM

(71) Applicant: Wells Fargo Bank, N.A., San Francisco, CA (US)

(72) Inventor: Phillip H. Griffin, Raleigh, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,761

(22) Filed: Dec. 27, 2021

Related U.S. Application Data

(63) Continuation of application No. 16/365,073, filed on Mar. 26, 2019, now Pat. No. 11,212,110.

(51) Int. Cl.
*H04L 9/32* (2006.01)
*G06F 21/60* (2013.01)
*G06F 21/64* (2013.01)
*H04L 9/00* (2022.01)

(52) U.S. Cl.
CPC .......... *H04L 9/3247* (2013.01); *G06F 21/602* (2013.01); *G06F 21/64* (2013.01); *H04L 9/50* (2022.05)

(58) Field of Classification Search
CPC ....... H04L 9/3247; H04L 9/50; G06F 21/602; G06F 21/64
See application file for complete search history.

(56) References Cited

U.S. PATENT DOCUMENTS

| | | | |
|---|---|---|---|
| 10,579,974 B1 | 3/2020 | Reed | |
| 11,146,383 B1 * | 10/2021 | Marquardt | H04L 9/0643 |
| 11,212,110 B1 * | 12/2021 | Griffin | G06F 21/602 |
| 2017/0337534 A1 | 11/2017 | Goeringer et al. | |
| 2020/0026619 A1 | 1/2020 | Kaji et al. | |
| 2020/0167319 A1 * | 5/2020 | Fritz | H04L 41/0806 |
| 2021/0004297 A1 | 1/2021 | Scrivner et al. | |
| 2021/0141909 A1 * | 5/2021 | Zhai | H04L 9/3239 |
| 2021/0256144 A1 * | 8/2021 | Shrinivasan | H04L 9/3236 |
| 2021/0264520 A1 * | 8/2021 | Cummings | H04L 9/3239 |

FOREIGN PATENT DOCUMENTS

| WO | WO 2021/090100 A1 * | 5/2021 | G06F 21/64 |
|---|---|---|---|
| WO | WO 2022/150049 A1 * | 7/2022 | H04L 9/32 |

* cited by examiner

*Primary Examiner* — Christopher A Revak
(74) *Attorney, Agent, or Firm* — Foley & Lardner LLP

(57) ABSTRACT

Arrangements of the present disclosure relate to a method for securing data located in a blockchain having a plurality of blocks. The method includes creating a pointer within a block of the plurality of blocks, the pointer pointing to a location external to the blockchain. In response to a request to protect data inside the block, the method further includes creating a security vault at the location, copying the block, and storing the copied block in the security vault using the pointer.

20 Claims, 6 Drawing Sheets

QUANTUM-SAFE BLOCKCHAIN VAULT SYSTEM

CROSS-REFERENCE TO RELATED APPLICATIONS

This application is a continuation of U.S. Pat. No. 11,212,110, entitled "Quantum-Safe Blockchain Vault System," filed Mar. 26, 2019, which is hereby incorporated by reference in its entirety and for all purposes.

BACKGROUND

A blockchain is a series of signed, hash-linked, append-only, timestamped blocks, each block containing arbitrary data. When viewed as a linked-list data structure, a blockchain is a limited data "stack" whose operations only allow users to "push" blocks onto the top. Users are not allowed to modify blocks or to "pull" blocks from the blockchain. Each new block that is added is appended to the topmost block in the stack. A new block links back to the former top-of-stack block by including a hash (e.g., a smaller mathematical representation) of the preceding block in the new block and binding this hash to the new block. Each block in the blockchain can be secured by security methods including public-key cryptography.

SUMMARY

One arrangement relates to a method for securing data located in a blockchain having a plurality of blocks. The method includes creating a pointer within a block of the plurality of blocks, the pointer pointing to a security vault located external to the blockchain. The method further includes copying the block, storing the copied block in the security vault using the pointer, and securing the security vault.

Another arrangement relates to a method for securing data located in a blockchain having a plurality of blocks. The method includes creating a pointer within a block of the plurality of blocks, the pointer pointing to a location external to the blockchain. In response to a need to protect data inside the block, the method includes creating a security vault at the location, copying the block, storing the copied block in the security vault using the pointer, and securing the security vault.

Another arrangement relates to a method for providing secured data external to a blockchain having a plurality of blocks. The method includes creating a security vault at a location external to the blockchain, the blockchain comprising a block, and securing multiple copies of the block in the security vault using at least one digital signature algorithm, each copy secured for a different user. The method further includes providing a user access to the user's copy of the block after the user provides an appropriate digital signature.

DETAILED DESCRIPTION

Figure 1:
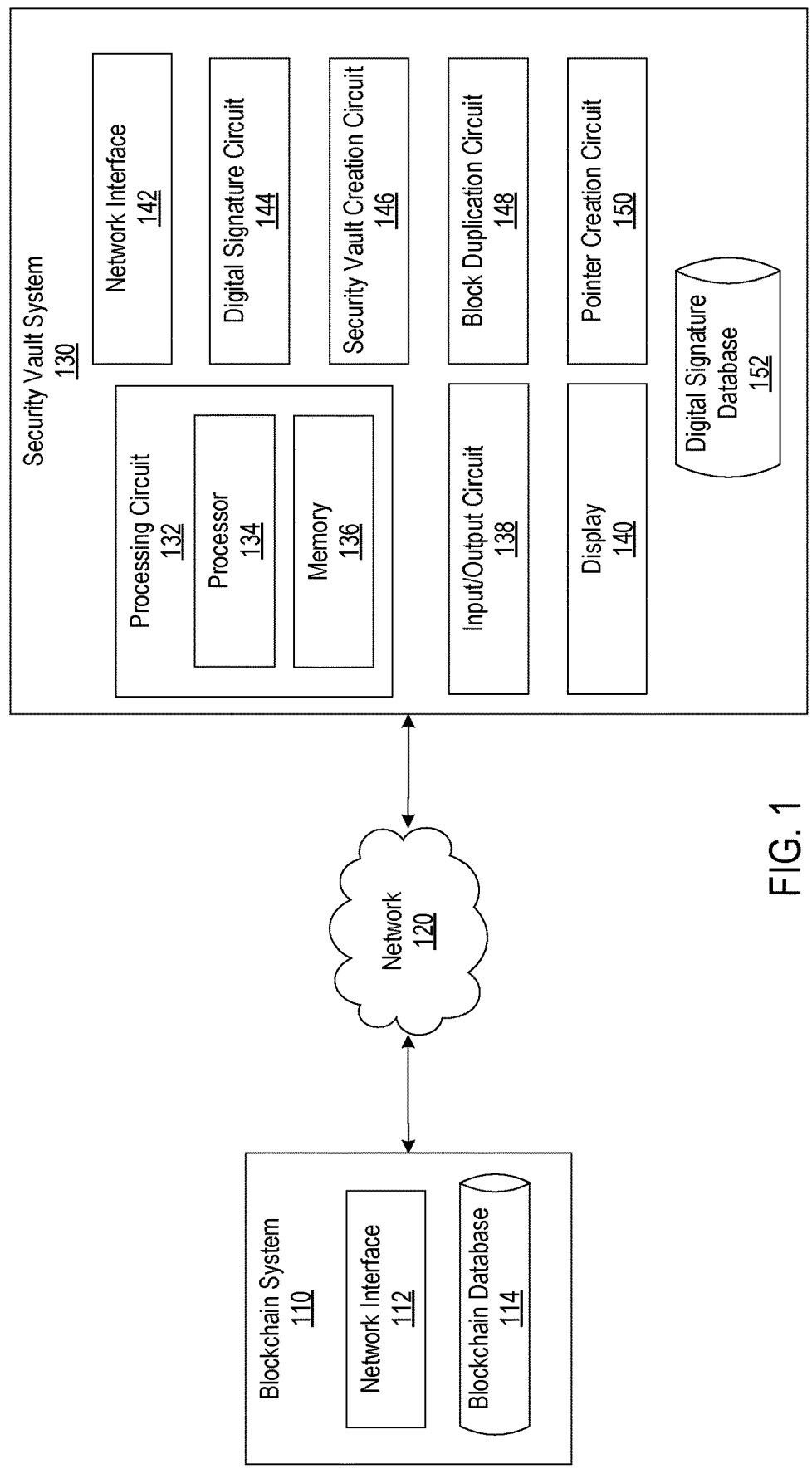
FIG. 1 is a block diagram of a system for implementing a blockchain vault system, according to some arrangements.

Referring generally to the FIGS., apparatuses, systems, methods, and non-transitory computer-readable media described herein relate to implementing a quantum-safe blockchain vault system. Arrangements described herein allow blockchain subscribers to mitigate the risk of cryptographic failures that may threaten the integrity and authenticity of the data stored in blockchain environments. These cryptographic failure types include the growing threats from post-quantum computing, advances in computing power, development of new cryptanalysis techniques and attacks that may weaken cryptographic strength, and the discovery of flaws in deployed cryptographic algorithms. These failure types can also arise from changes in the security policy of an organization, or they may stem from external sources such as legal or regulatory entities.

To mitigate these risks, arrangements described herein provide for a security vault that can be used to preserve the data integrity and authenticity in a blockchain block. The security safeguard can be employed without affecting the normal processing operations of the blockchain, and without necessarily changing the size or format of its data blocks. The preserved block can be sourced from any block of any type or format of any blockchain from any vendor. The security vault is located external to the block, but optionally it can be reached through a link to the vault that is included in the block header, or within a field in the block data. The security vault can optionally link to a block, transaction, or a data field within the block.

The security vault locator for a given block is inserted into the header of each new block as it is being added to a blockchain. The security vault includes a pointer that need not initially point to any existing vault, but only to a location at which a vault may one day exist. The location may be populated by an actual security vault as needed by a blockchain subscriber, or on demand by a blockchain provider in response to a request by a subscriber, perhaps to preserve data in a block that has just become subject to legal discovery or regulatory oversight.

The security vault location may be protected by access controls to limit access only to authorized parties. In permissionless and public blockchains there may be no limitations placed on access to a security vault. In permissioned and private blockchains, access may include all blockchain participants, a subset of these participants, or a set or superset of parties that can include access for regulatory and legal entities, perhaps to facilitate oversight, law enforcement, or legal discovery activities.

An implementation of a security vault location and/or type, provided here as one example, is defined as a set of one or more choice alternatives, each alternative indicating a different type of vault or physical location. Different vault types may be supported by an implementation to manage security risks, costs of protection, controlled availability, and levels of assurance required by blockchain participants. Vaults may be protected simply by access controls (and associated logging, monitoring, and alerting systems), as software wallets (accessible by passwords, biometrics keys, etc.), as hardware wallets, as National Institute of Standards and Technology (NIST) Federal Information Processing Standards (FIPS) 140-2 rated Hardware Security Modules (HSM) that have been certified at any of the four levels (e.g., Security Levels 1-4), as Cryptographic Message Syntax (CMS) messages such as SignedData and SigncryptedData, or by other security controls.

The described security vault can use one or more of any digital signature algorithm chosen by the user to re-sign the block header and data. The new signature serves to wrap a previously signed block in a stronger digital signature. This wrapping can be applied so as to preserve the original signature on the block data and the block header. In some implementations, this wrapper can be 'detached' while in other implementations the wrapper can serve as a signature envelope. The stronger signature used to wrap the block may be one that relies on a signature algorithm that is deemed to be 'quantum-safe'. The wrapping algorithm may employ the same algorithm used to previously sign the block, but using a different, longer key length or algorithm parameters. A different hash algorithm may also be used for the wrapper.

In some implementations, the security vault may be used to wrap the block in multiple signatures, each signature employing a different algorithm, asymmetric key, key length, algorithm parameters, or hash. Multiple signatures may be used for any purpose, such as for providing vault protection using signatures that comply with the security requirements of multiple parties. Multiple signatures may also be used to minimize the risk of failure of any given wrapping algorithms. This capability can provide a property known as 'cryptographic resilience' so that if one algorithm should fail, others might remain viable.

The described vault may be implemented using some combination of software, hardware, or a series of one or more layered security controls (e.g., firewalls, access controls, monitoring, audits, etc.). In the case of software controls, the cryptographic protections afforded by the SignedData, SigncryptedData, and other of the standardized Cryptographic Message Syntax (CMS) messages could be employed to implement the vault. These might be used alone or in combination with hardware-based controls, such as hardware wallets or HSMs.

The availability of such a vault makes possible a set of security services. These services may be offered by a blockchain provider to its subscribers. These services may also be employed to automate aspects of a blockchain subscriber organization's security policy compliance program. Provision of these services need not depend on the participation, permission, or awareness of the blockchain provider or of other subscribers.

Arrangements described herein further provide for a tiered set of security vault services offered by a blockchain provider to its subscribers. These services may allow the provider or their subscribers to specify policy and policy qualifier information to be included in a given instance of a customized version of the security vault. This customized security vault may include other information such as the type and location of their security vault stores, the signature and hash algorithms supported by the subscriber, and the set of signature and hash algorithms that should be included in the security vault written by the provider on behalf of the subscriber.

Arrangements described herein also provide a means of ensuring data stored on the blockchain that must be preserved for production in legal discovery, regulatory submissions, or other instances in which data must be preserved, is available and enjoys authenticity and integrity of data production.

Arrangements described herein further provide for automating the management of disaster recovery and business continuity planning processes for data stored in a blockchain environment shared by multiple subscribers. These management processes may be provided as a tiered service offering by a blockchain provider, and may be provided on demand of the subscriber to support preservation of blocks of data subject to legal discovery orders.

To provide disaster recovery assurance, an arrangement described herein may use a series of values for a given block each pointing to a vault in a different geographic location. In a blockchain whose participants reside in different legal or regulatory jurisdictions, one security vault choice alternative may be used to address the needs of specific participants. The list of security vaults may be tailored to address the needs of only those participants who have data residing in a given block, or based on the policy of a given participant, perhaps qualified by the monetary amount of a transaction or set of their transactions included in a given block, or their cryptographic algorithm requirements.

The disclosed arrangements do not require modification to provide a general-purpose solution. Arrangements described herein can be applied to any industry interested in automating a periodic, continuing re-signature process to protect the integrity an authenticity of blockchain header and data information from cryptographic failures. Such failures include those that may arise in a post-quantum computing future or stem from changing policy requirements.

This automated processing may also be used to reduce the risk of failing to comply with legal discovery orders to produce records. Blocks identified by a blockchain subscriber as containing records within the scope of discovery can be placed in a quantum-safe blockchain vault to increase assurance and provide evidence that measures have been undertaken to ensure they have been preserved and can be produced. To facilitate ease of access by a legal adversary demanding discovery, the block can be signed using an algorithm suitable to the legal adversary and co-signed by the discovery data provider.

FIG. 1 is a block diagram of a system for implementing a blockchain vault system, according to some arrangements. The system includes at least a blockchain system 110 and a security vault system 130. Each of the blockchain system 110 and the security vault system 130 is a computing system having processing, storage, and networking capabilities for implementing a blockchain vault system. In some arrangements, the blockchain system 110 can be a distributed ledger system comprising blocks of data managed by a peer-to-peer network. The blocks of data can include a wide variety of data (e.g., financial data, legal data, regulatory data, contract data, or any other data that may need to be recorded in a blockchain). Each block of data is connected the previous block of data with a cryptographic hash of the previous block, thus maintaining a link between blocks in the blockchain system 110.

In some arrangements, the security vault system 130 can be a software based system (e.g., SignedData, Signcrypted-Data, and other of the standardized Cryptographic Message Syntax (CMS) messages). In some arrangements, the security vault system 130 can be a hardware based system (e.g., hardware wallets, Hardware Security Modules (HSM), or other hardware based security systems. In some arrangements, the security vault system can include layered security controls (e.g., firewalls, access controls, monitoring, audits, or other types of layered security controls). In particular, the blockchain system 110 can communicate with the security vault system 130 via the network 120.

The network 120 is any suitable Local Area Network (LAN), Wide Area Network (WAN), or a combination thereof. For example, the network 120 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1x Radio Transmission Technology (1x), General Packet Radio Service (GPRS), Personal Communications Service (PCS), 802.11X, ZigBee, Bluetooth, Wi-Fi, any suitable wired network, combination thereof, and/or the like. The network 120 is structured to permit the exchange of data, values, instructions, messages, and the like.

The blockchain system 110 is shown to include a network interface 112 and a blockchain database 114. The network interface 112 is configured for and structured to establish a connection with the security vault system 130. The network interface 112 is structured for sending and receiving of data over a communication network (e.g., the P2P network). Accordingly, the network interface 112 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The blockchain database 114 is configured to retrievably store information relating to blocks in the blockchain system 110. For example, the blockchain database 114 may include information related to the block identification information (e.g., the block version, the Merkle Root, previous block hash, or any pointers located with the block header or identification information).

The security vault system 130 is shown to include various circuits and logic for implementing the operations described herein. More particularly, the security vault system 130 includes one or more of a processing circuit 132, an input/output circuit 138, a display 140, a network interface 142, a digital signature circuit 144, a security vault creation circuit 146, a block duplication circuit 148, a pointer creation circuit 150, and a digital signature database 152. While various circuits, interfaces, and logic with particular functionality are shown, it should be understood that the security vault system 130 includes any number of circuits, interfaces, and logic for facilitating the operations described herein. For example, the activities of multiple circuits are combined as a single circuit and implemented on a same processing circuit (e.g., the processing circuit 132), as additional circuits with additional functionality are included. In some arrangements, the processing circuit 132 has a processor 134 and memory 136.

The processor 134 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 136 (e.g., Random Access Memory (RAM), Read-Only Memory (ROM), Non-volatile RAM (NVRAM), Flash Memory, hard disk storage, etc.) stores data and/or computer code for facilitating the various processes described herein. Moreover, the memory 136 is or includes tangible, non-transient volatile memory or non-volatile memory. Accordingly, the memory 136 includes database components, object code components, script components, or any other type of information structure for supporting the various activities and information structures described herein.

The input/output circuit 138 is configured to receive user input from and provide information to the user. In this regard, the input/output circuit 138 is structured to exchange data, communications, instructions, etc. with an input/output component of the blockchain system 110. Accordingly, in some arrangements, the input/output circuit 138 includes an input/output device such as a display device, touchscreen, keyboard, microphone, and/or the like. In some arrangements, the input/output circuit 138 includes communication circuitry for facilitating the exchange of data, values, messages, and the like between the input/output device and the components of the blockchain system 110. In some arrangements, the input/output circuit 138 includes machine-readable media for facilitating the exchange of information between the input/output device and the components of the blockchain system 110. In still another arrangement, the input/output circuit 138 includes any combination of hardware components (e.g., a touchscreen), communication circuitry, and machine-readable media.

In some arrangements, the display 140 may be a screen, a touchscreen, a monitor, or any other device capable of displaying information to a user. The security vault system 130 may use the display 140 to communicate information to a user. In some arrangements, the display 140 is located in the same geographic location as the security vault system 130. In some arrangements, the display 140 is located in a different geographic location than the security vault system 130 such that information regarding the security vault system 130 can be communicated to user in a geographic location different than that of the security vault system 130.

The network interface 142 is configured for and structured to establish connection with the blockchain system 110. The network interface 142 is structured for sending and receiving of data over a communication network (e.g., the P2P network). Accordingly, the network interface 142 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The digital signature circuit 144 is executed by the processing circuit 132 in some arrangements. The digital signature circuit 144 can run digital signature algorithms to create digital signatures to protect a security vault created by the security vault system 130. Non-limiting examples of digital signature algorithms include Rivest-Shamir-Adleman (RSA), Elliptic Curve Digital Signature Algorithm (ECDSA), Schnorr Signature Algorithm, and other algorithms that can create digital signatures to protect data from post-quantum computing threats.

The security vault creation circuit 146 is executed by the processing circuit 132 in some arrangements. The security vault creation circuit 146 can create a digital storage space in which data can be stored and protected by the digital signatures created by the digital signature circuit 144. In some arrangements, the security vault creation circuit 146 can create the digital storage space within storage system external to the blockchain system 110. For example, the security vault creation circuit 146 can create a data storage folder in a conventional data storage medium (e.g., semiconductor storage media, magnetic storage media, optical storage media, or other types of conventional storage media). In some arrangements, the security vault creation circuit 146 can create the digital storage space within a dedicated secure hardware platform (e.g., a hardware wallet, a hardware security module, or hardware systems designed to protect data).

The block duplication circuit 148 is executed by the processing circuit 132 in some arrangements. The block duplication circuit 148 can copy a block of the blockchain system 110 and reproduce a copy of the block, including transaction data and header data. The copied block is an exact copy of the block at the time the copy was made. For example, a copy of a block made at time $t_1$ includes all of the transaction data available at $t_1$. Additional transactions made and recorded on the original block after $t_1$ will not be part of the copied block.

The pointer creation circuit 150 is executed by the processing circuit 132 in some arrangements. In some arrangements, the pointer creation circuit 150 can create a pointer within a block that indicates the location of a security vault in which a copy of the block is held. In some arrangements, the pointer creation circuit 150 can create a pointer within a block that points to an empty location that may be filled by a security vault in the future. Because the pointer information is in the block, the location of the copy is publicly known. However, because the copy is secured by the digital signature circuit 144, the copy of the block cannot be viewed unless a user has the correct digital signature credentials.

The digital signature database 152 is configured to retrievably store information relating to the digital signatures created by the digital signature circuit 144. For example, the digital signature database 152 may provide stored digital signatures for comparison to user provided digital signatures for the security vault system 130 to determine whether the user has the correct digital signature credentials to access a block located in a security vault. As shown, the digital signature database 152 is part of the security vault system 130. However, in some arrangements the digital signature database 152 can an additional blockchain external to the security vault system 130 and the blockchain system 110.

Figure 2A:
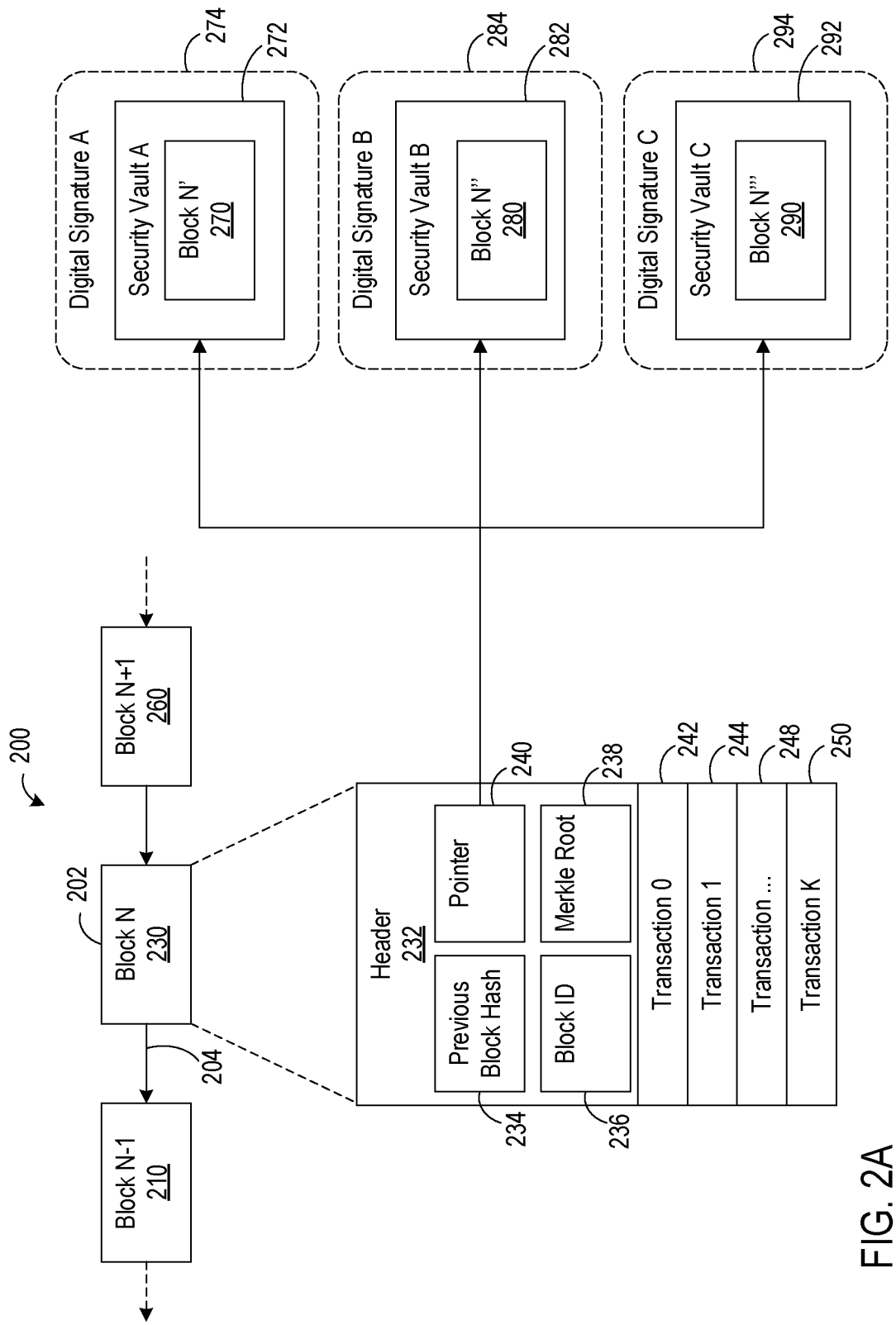
FIG. 2A is a block diagram of an example of a block being secured external to a blockchain, according to some arrangements.

FIG. 2A is a block diagram of an example of a block being secured external to a blockchain 200, according to some arrangements. As shown in FIG. 2A, the blockchain 200 includes a number of blocks 202, with each block including a hash-link 204 to the previous block 202 in the blockchain 200. In the example of FIG. 2A, block N includes data that a user wants to protect. For example, the data may include sensitive legal information that must be maintained for the purposes of impending discovery, sensitive regulatory information that may need to be submitted to a governmental agency, or sensitive business data that must be retained.

Block N includes a header 232 and transactions 242-250. The header includes a previous block hash 234, a block ID 236, a merkle root 238, and a pointer 240. The previous block hash 234 is a unique identifier of block N-1, the block in the blockchain 200 previous to block N. The previous block hash 234 is used to create the hash of block N such that only block N can be the block subsequent to block N-1, thus maintaining the linkage in the blockchain 200.

The block ID 236 is the unique identification of block N. The block ID 236 can contain the hash of block N, which is generated using the hash of block N-1, as described. The block ID 236 can also contain the height of the block in the blockchain 200. For example, block N may be in position 50 in the blockchain 200. This position indicates that there are 49 blocks previous to block N in the blockchain 200.

The merkle root 238 is a summary of all the transactions in block N, and is calculated by recursively hashing pairs of nodes (e.g., transactions) in block N until there is only one hash left (e.g., the merkle root 238). The merkle root 238 provides a way to authenticate the data in block N at a given point in time. For example, the merkle root 238 for block N at transaction 1 will be different than the merkle root 238 for block N at transaction K. However, for any given transaction at a given time, the transaction can be verified by providing the merkle root 238 at that time.

The pointer 240 is an object that stores the location of a copy of block N. In some arrangements, the pointer 240 can point to a virtual location (e.g., the memory address of a value located in a computer memory). In some arrangements, the pointer 240 can point to a physical location (e.g., the geographic location of a hardware security module). In some arrangements, the pointer 240 can point to both physical and virtual locations. In some arrangements, the pointer 240 comprises multiple pointers that point to the locations of different copies of block N.

As shown in FIG. 2A, the pointer 240 points to a security vault A 272, a security vault B 282, and a security vault C 292. In some arrangements, security vault A 272, security vault B 282, and security vault C 292 are virtual locations in which a copy of block N can be stored. In some arrangements, security vault A 272, security vault B 282, and security vault C 292 are secure hardware in one or more geographic locations in which a copy of block N can be stored. In some arrangements, at least one of security vault A 272, security vault B 282, and security vault C 292 is a virtual location and at least one of security vault A 272, security vault B 282, and security vault C 292 is secure hardware in a geographic location. In some arrangements, a single security vault (e.g., the security vault A 272) can be a combination of access controls (and associated logging, monitoring, and alerting systems), software wallets (accessible by passwords, biometric keys, and other accessibility options), hardware wallets (e.g., certified hardware security modules), or any other security controls.

Security vault A 272 is shown to include a block N' 270 and is wrapped in a digital signature A 274. Block N' 270 is a copy of block N, including all of the information in block N at the time block N' 270 was created. In some arrangements, the digital signature A 274 can be a single digital signature. In some arrangements, the digital signature A 274 can be multiple digital signatures constructed in layers such that, in order to access block N' 270, a user must successfully provide the matching digital signatures for each layer. In some arrangements, the digital signature A 274 can preserve the original signature from block N as one layer of signatures. In some arrangements, at least one of the layers of the digital signature A 274 is a quantum-safe digital signature. In some arrangements, the signature layers of the digital signature A 274 can utilize different digital signature algorithms, asymmetric keys, key lengths, algorithm parameters, or hashes. The digital signature A 274 can also bind additional attributes of any type or format to the blockchain object being signed. In some arrangements, these attributes can include a local or trusted timestamp.

Security vault B 282 is shown to include a block N" 280 and is wrapped in a digital signature B 284. Block N" 280 is a copy of block N, including all of the information in block N at the time block N" 280 was created. In some arrangements, the digital signature B 284 can be a single digital signature. In some arrangements, the digital signature B 284 can be multiple digital signatures constructed in layers such that, in order to access block N" 280, a user must successfully provide the matching digital signatures for each layer. In some arrangements, the digital signature B 284 can preserve the original signature from block N as one layer of signatures. In some arrangements, at least one of the layers of the digital signature B 284 is a quantum-safe digital signature. In some arrangements, the signature layers of the digital signature B 284 can utilize different digital signature algorithms, asymmetric keys, key lengths, algorithm parameters, or hashes. The digital signature B 284 can also bind additional attributes of any type or format to the blockchain object being signed. In some arrangements, these attributes can include a local or trusted timestamp.

Security vault C 292 is shown to include a block N''' 290 and is wrapped in a digital signature C 294. Block N''' 290 is a copy of block N, including all of the information in block N at the time block N''' 290 was created. In some arrangements, the digital signature C 294 can be a single digital signature. In some arrangements, the digital signature C 294 can be multiple digital signatures constructed in layers such that, in order to access block N''' 290, a user must successfully provide the matching digital signatures for each layer. In some arrangements, the digital signature C 294 can preserve the original signature from block N as one layer of signatures. In some arrangements, at least one of the layers of the digital signature C 294 is a quantum-safe digital signature. In some arrangements, the signature layers of the digital signature C 294 can utilize different digital signature algorithms, asymmetric keys, key lengths, algorithm parameters, or hashes. The digital signature C 294 can also bind additional attributes of any type or format to the blockchain object being signed. In some arrangements, these attributes can include a local or trusted timestamp.

As described, the data from block N is copied and included in a security vault as a separate block. However, in some arrangements a copy of block N is not included in the security vault as a separate block and a hash of block N (or a hash of the data included in block N) is included in the security vault. For example, instead of block N' 270 being located in security vault A 272, a hash of block N is located in security vault A 272.

Figure 2B:
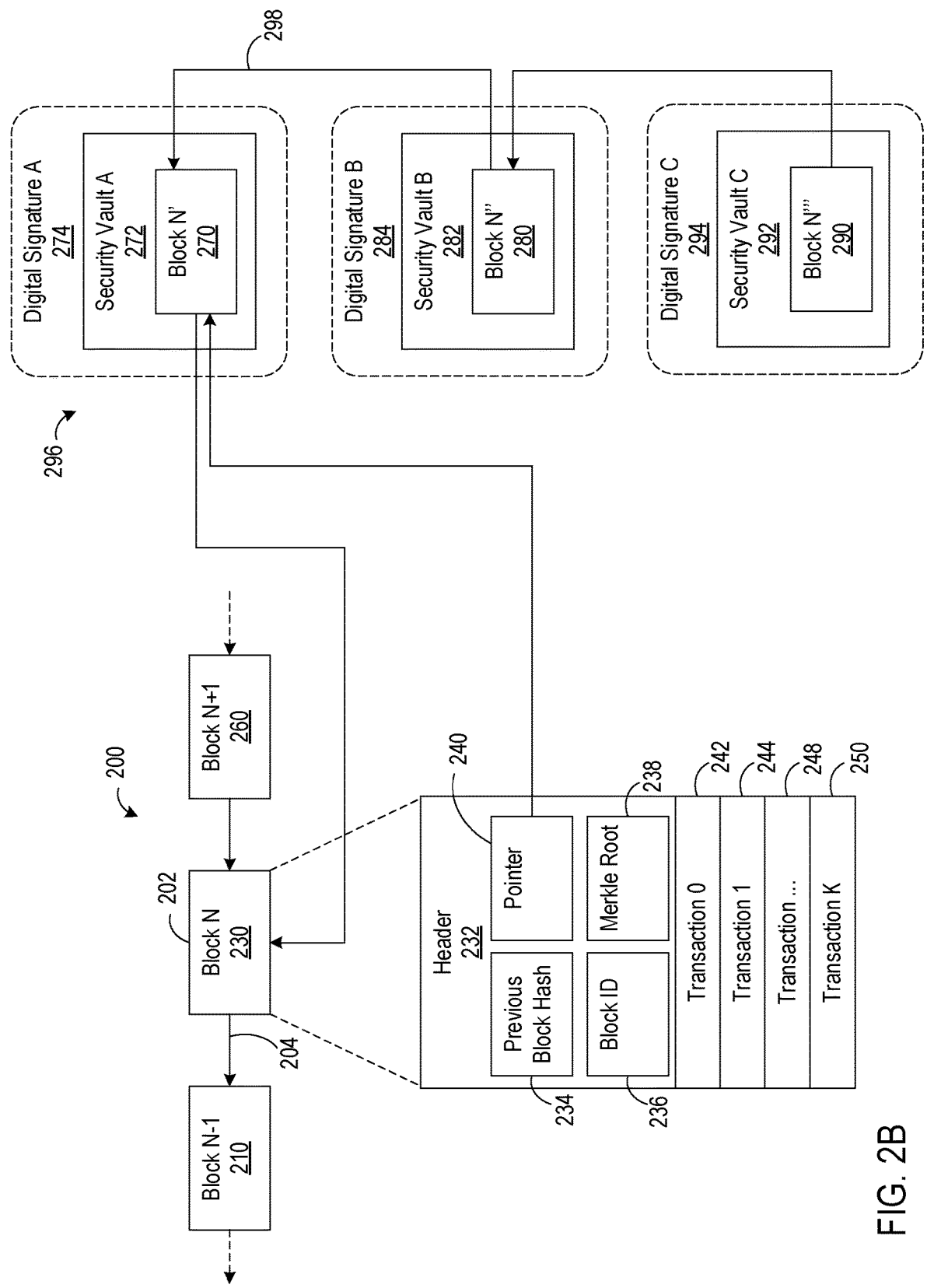
FIG. 2B is a block diagram of another example of a block being secured external to a blockchain, according to some arrangements.

FIG. 2B is a block diagram of another example of a block being secured external to a blockchain, according to some arrangements. As shown in FIG. 2B, block N' 270, block N" 280, and block N''' 290 form a blockchain 296 separate from the blockchain 200. Each block includes a hash-link 298 to the previous block in the blockchain 296 such that each block and its respective security vaults and digital signatures are maintained in the blockchain 296. In this arrangement, the pointer 240 points only to block N'270, and because block N' 270 is linked to block N" 280 and block N''' 290, the pointer 240 does not need to point to the other blocks. Furthermore, block N' 270 points to block N such that the blockchain 296 and the blockchain 200 are redundantly linked. Such a redundant linkage provides additional security should one of the links become compromised.

In some arrangements, the blockchain 296 is a sidechain of the blockchain 200. As used herein, a sidechain refers to a separate blockchain that is attached to the main blockchain using a two-way communication channel. The communication channel enables information to be exchanged between the main blockchain and the sidechain. In such arrangements where the blockchain 296 is a sidechain of the blockchain 200, the pointer 240 is not used as the sidechain and the blockchain 200 are in communication with each other.

Figure 3:
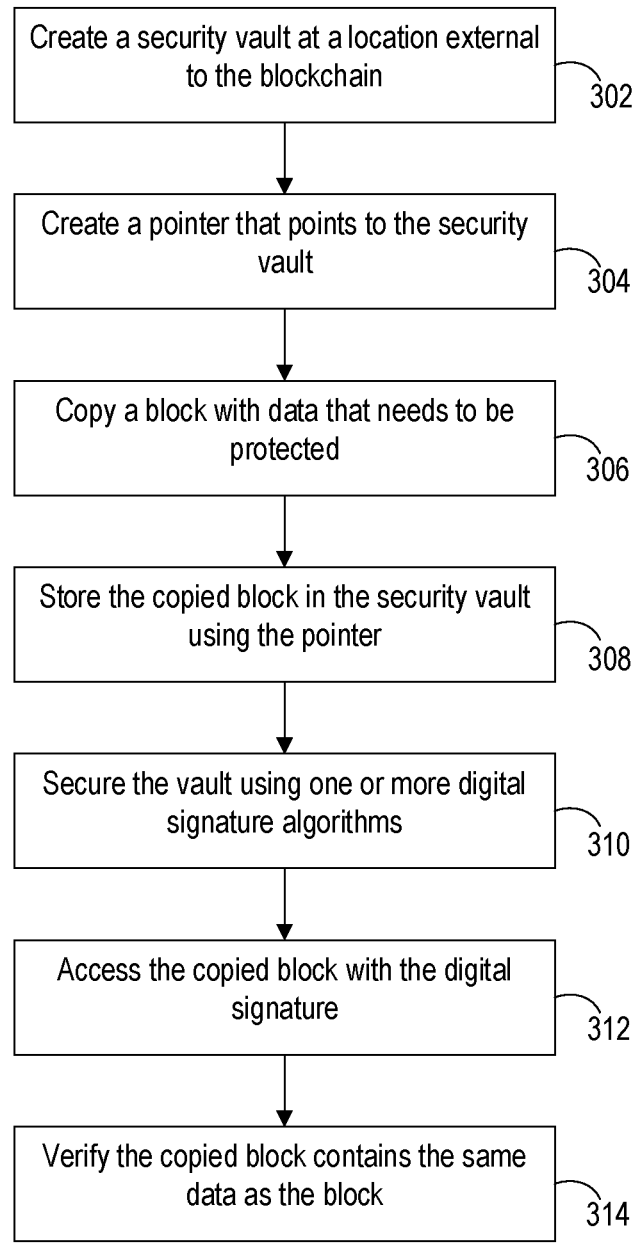
FIG. 3 is a flow diagram illustrating a method for securing a block external to a blockchain, according to some arrangements.

FIG. 3 is a flow diagram illustrating a method 300 for securing a block external to a blockchain, according to some arrangements. Referring to FIGS. 1-2, the method 300 is executed by the security vault system 130 in some arrangements.

At 302, a security vault is created at a location external to the blockchain for a block containing data that needs to be protected (e.g., block N). Illustrating with a non-limiting example, one or more security vaults may need to be created to protect sensitive, confidential information that would be irreplaceable or extremely difficult to replace if the information were somehow lost or corrupted (e.g., information that will be used for a future regulatory submission, information required for discovery in a legal dispute, or information that must be retained for business purposes).

To provide for redundant security, multiple security vaults can be created by the security vault creation circuit 146. For example, security vault A 272 may be created in a virtual location (e.g., a cloud-based system), security vault B 282 may be created in a geographic location that is susceptible to earthquakes, and security vault C 292 may be created in a geographic location that is susceptible to hurricanes. Each location is external to the blockchain 200. Because it is unlikely that the data stored in security vault A 272, security vault B 282, and security vault C 292 will be lost, destroyed, damaged, or corrupted at the same time (e.g., the cloud-based system is hacked, an earthquake occurs, and a hurricane occurs at the same time), the stored data will be secure because of the storage redundancy. In some arrangements, the locations in which each security vault is located refer to locations that can differ in terms of security (e.g., locations that employ different security measures). In some arrangements, the locations in which each security vault is located refer to locations that can differ in terms of legal requirements (e.g., countries that follow different laws related to the data). In some arrangements, the locations in which each security vault is located refer to locations that can differ in terms of regulatory requirements (e.g., legislations that employ different regulations related to the data).

At 304, a pointer 240 is created that points to security vault A 272, security vault B 282, and security vault C 292. In some arrangements, a single pointer 240 can be created by the pointer creation circuit 150 that includes information related to the location of security vault A 272, security vault B 282, and security vault C 292. In some arrangements, multiple pointers 240 can be created by the pointer creation circuit 150, with each pointer pointing to the location of one of security vault A 272, security vault B 282, and security vault C 292.

At 306, the block including the data that needs to be protected (e.g., block N) is copied. The block duplication circuit 148 copies the block N to create copies for each security vault created. For example, the block duplication circuit 148 creates block N' 270 to be stored in security vault A 272, block N" 280 to be stored in security vault B 282, and block N''' 290 to be stored in security vault C 292.

At 308, the copies of the block N are stored in security vault A 272, security vault B 282, and security vault C 292 using the pointer 240. For example, block N' 270 is stored in security vault A 272 using the pointer 240, block N" 280 is stored in security vault B 282 using the pointer 240, and block N''' 290 is stored in security vault C 292 using the pointer 240.

At 310, security vault A 272, security vault B 282, and security vault C 292 are secured using one or more digital signature algorithms. For example, security vault A 272 is secured by the digital signature A 274, security vault B 282 is secured by the digital signature B 284, and security vault C 292 is secured by the digital signature C 294. In some arrangements, the digital signature A 274, the digital signature B 284, and the digital signature C 294 are all the same digital signatures. For example, the digital signature A 274, the digital signature B 284, and the digital signature C 294 can all be the same asymmetric key. In some arrangements, the digital signature A 274, the digital signature B 284, and the digital signature C 294 are different digital signatures. For example, the digital signature A 274, the digital signature B 284, and the digital signature C 294 can all be different asymmetric keys. In some arrangements, one or more of the digital signature A 274, the digital signature B 284, and the digital signature C 294 can include more than one digital signature wrapped around the security vault. For example, the digital signature A 274 can include an innermost digital signature using a first set of algorithm parameters, an intermediate digital signature using a second set of algorithm parameters, and an outermost digital signature using a third set of algorithm parameters. In some arrangements, the block N' 270 can also include the signature from block N such that the digital signature A 274 is wrapped around the original digital signature of block N.

At 312, the copies of block N are accessed with the digital signature. For example, block N may have been somehow compromised, and the authenticity of the original data in block N may questioned. To verify the original data in block N, one or more of block N' 270, block N" 280, and block N'" 290 can be accessed by a user. For example, to access block N' 270, a user can enter the appropriate digital signature(s) into the security vault system 130. If the user enters the digital signature(s) correctly, the user is granted access to the block N' 270. If the user does not enter the digital signature (s) correctly, the user is not granted access to the block N' 270.

At 314, the user verifies that block N' 270 contains the same data as block N. For example, the user can compare the previous block hash 234, the block identifier 236, and the merkle root 238 located within block N' 270 with the information located in block N at the time block N' 270 was created. If the information matches, the user has verified that the data in block N' 270 contains the same data as block N. As another example, if block N was somehow destroyed or otherwise unreadable, the user could verify that the block N' 270 contains the same information as block N did before it was destroyed by using the previous block hash 234 to verify the position of block N' 270 in the blockchain 200. In addition, the user could use the merkle root 238 to verify the configuration of the blockchain 200 at the time block N' 270 was created. By verifying the previous block hash 234 and the merkle root 238, the user can verify that the data contained in block N' 270 is the same data that was originally in block N.

In arrangements where the security vault contains a hash of block N instead of a copy of block N, the data can be verified by comparing the hash of block N with the hash stored in the security vault. For example, the user can compare the hash of block N with the hash stored in security vault A 272. If the hashes are identical, the data contained in block N can be verified.

Figure 4:
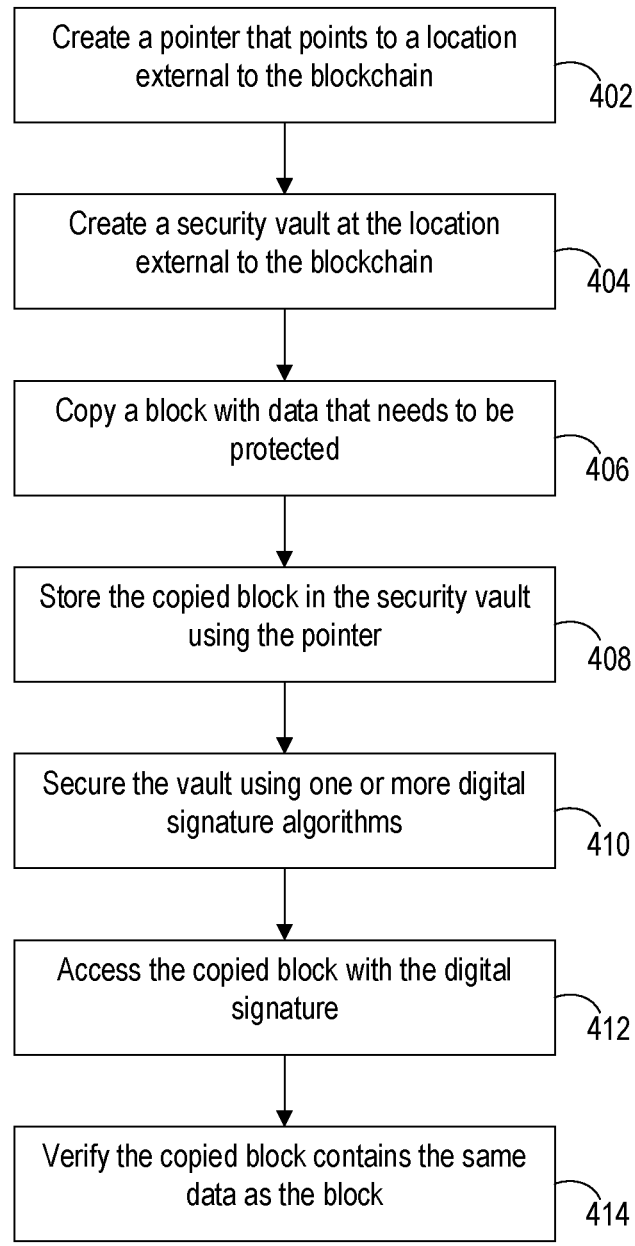
FIG. 4 is a flow diagram illustrating a method for securing a block external to a blockchain, according to some arrangements.

FIG. 4 is a flow diagram illustrating a method 400 for securing a block external to a blockchain, according to some arrangements. Referring to FIGS. 1-2, the method 400 is executed by the security vault system 130 in some arrangements.

At 402, a pointer 240 is created that points to one or more locations external to the blockchain 200. In some arrangements, a single pointer 240 can be created by the pointer creation circuit 150 that includes information related to external location(s). In some arrangements, multiple pointers 240 can be created by the pointer creation circuit, with each pointer pointing to a different external location. The external(s) location may be empty such that the pointer points to an empty space until an object is created at the external location(s).

In some arrangements, a blockchain provider can manage the blockchain 200. The blockchain provider can design each block in the blockchain 200 such that every block includes a pointer to one or more locations external to the blockchain 200. By doing so, the blockchain provider can offer future security services should a subscriber to the blockchain 200 need to secure one or more blocks in the future.

At 404, a security vault is created at a location external to the blockchain for a block containing data that needs to be protected (e.g., block N). Illustrating with a non-limiting example, data in block N may become relevant to a pending lawsuit and therefore must be available for discovery. To better preserve the data for discovery purposes, the owner of the data may contact the blockchain provider and inform the blockchain provider that additional security is required for block N. The blockchain provider can create a security vault in response to the request of the owner, and the security vault is created at an external location to which the previously created pointer 240 points.

In some arrangements, a request to protect the data in block N can originate from multiple parties. For example, the owner of the data can request to protect the data, as described. In addition, an adverse party may request to protect the data separately from the data protected by the owner. Furthermore, the government may also request to protect the data separately from both of the other parties. The blockchain provider can create different security vaults in previously empty locations and link the different pointers 240 to the different security vaults. For example, the blockchain provider can create security vault A 274 for the data owner, security vault B 284 for the adverse party, and security vault C 294 for the government.

At 406, the block including the data that needs to be protected (e.g., block N) is copied. The block duplication circuit 148 copies the block N to create copies for each security vault created. For example, the block duplication circuit 148 creates block N' 270 to be stored in the security vault A 272 and block N" 280 to be stored in the security vault B 282, and block N'" 290 to be stored in the security vault C 292.

At 408, the copies of the block N are stored in security vault A 272, security vault B 282, and security vault C 292 using the pointer 240. For example, block N' 270 is stored in security vault A 272 using the pointer 240, block N" 280 is stored in security vault B 282 using the pointer 240, and block N'" 290 is stored in security vault C 292 using the pointer 240.

At 410, security vault A 272, security vault B 282, and security vault C 292 are secured using one or more digital signature algorithms. For example, security vault A 272 is secured by the digital signature A 274, security vault B 282 is secured by the digital signature B 284, and security vault C 292 is secured by the digital signature B 294. Because different entities requested the creation of each of the security vaults, each entity may require a different level of security associated with its respective vault. For example, the owner of the original data (e.g., the owner of block N' 270) may require the digital signature A 274 to include four different digital signatures wrapped around block N' 270, with the signatures increasing in complexity with each layer. The adverse party (e.g., the owner of block N" 280) may require the digital signature B 284 to include 2 different digital signatures wrapped around block N" 280, with the signatures being the same complexity in each layer. The government (e.g., the owner of block N'" 290) may require the digital signature C to include a single digital signature wrapped around block N'" 290.

At 412, the copies of block N are accessed with the digital signatures. For example, the adverse party and the government may question the authenticity of the original data in block N. To verify the original data in block N, the owner can access block N' 270, the adverse party can access block N" 280, and the government can access block N'" 290. Because the original block N is publicly available, all parties can access block N for comparison.

To access the blocks N' 270, N" 280, and N'" 290, the owner, the adverse party, and the government can enter the appropriate digital signature(s) for their respective blocks into the security vault system 130. If the digital signature(s) is/are entered correctly, access is granted access to the appropriate block. If the digital signature(s) is not/are not entered correctly, the access to the appropriate block is not granted.

At 414, the parties verify that blocks N' 270, N" 280, and N'" 290 contain the same data as block N. For example, the owner, the adverse party, and the government can compare the previous block hash 234, the block identifier 236, and the merkle root 238 located within each party's respective copy of block N with the information located in block N at the time each copy of block N was created. If the information matches, the user has verified that the data in the copied blocks contains the same data as block N. As another example, if block N was somehow destroyed or otherwise unreadable, the owner, the adverse party, and the government could verify that each party's respective copied block contains the same information as block N did before it was destroyed by using the previous block hash 234 to verify the position of block N' 270 in the blockchain 200. In addition, the owner, the adverse party, and the government could use the merkle root 238 to verify the configuration of the blockchain 200 at the time each party's respective copied block was created. By verifying the previous block hash 234 and the merkle root 238, the owner, the adverse party, and the government can verify that the data contained in each party's respective copied block is the same data that was originally in block N.

In arrangements where the security vault contains a hash of block N instead of a copy of block N, the data can be verified by comparing the hash of block N with the hash stored in the security vault. For example, the user can compare the hash of block N with the hash stored in security vault A 272. If the hashes are identical, the data contained in block N can be verified.

Figure 5:
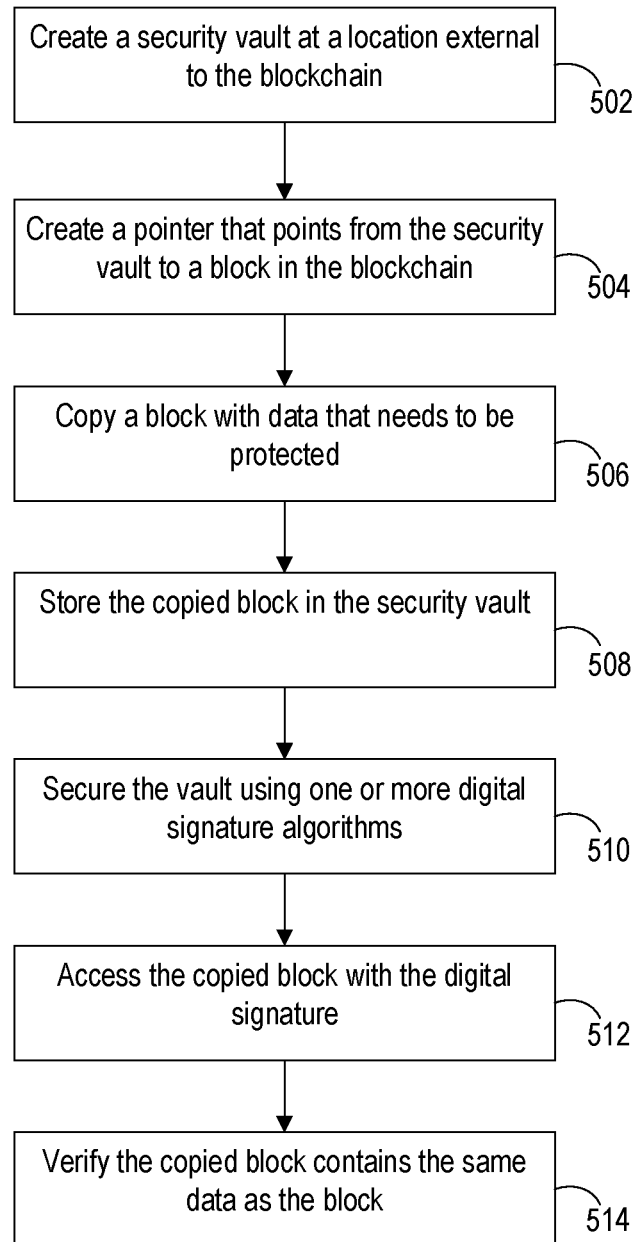
FIG. 5 is a flow diagram illustrating a method for securing a block external to a blockchain, according to some arrangements.

FIG. 5 is a flow diagram illustrating a method for securing a block external to a blockchain, according to some arrangements. Referring to FIGS. 1-2, the method 400 is executed by the security vault system 130 in some arrangements.

At 502, a security vault is created at a location external to the blockchain 200 for a block containing data that needs to be protected (e.g., block N). Illustrating with a non-limiting example, data in block N may become relevant to a government proceeding and therefore must be protected. To better preserve the data, the owner of the data (e.g., a subscriber to a blockchain provider service) may create a security vault external to the blockchain 200 outside of the control or knowledge of the blockchain provider.

At 504, a pointer is created that points to the block in the blockchain 200 (e.g., block N) that contains the data that needs to be protected. For example, the owner of the data can create a pointer that points from the security vault created at 502 to block N.

At 506, the block including the data that needs to be protected (e.g., block N) is copied. For example, the block duplication circuit 148 copies block N to create a copy for the created security vault.

At 508, the copy of block N is stored in the created security vault. At 510, the created security vault is secured using one or more digital signature algorithms. For example, the created security vault can be secured by any of the digital signatures previously described. Furthermore, multiple digital signatures can be used to secure the created security vault in a layered manner as previously described.

At 512, the copy of block N is accessed with the digital signature. For example, the government may question the authenticity of the original data in block N. To verify the original data in block N, the data owner can access the copy of block N stored in the created security vault. To access the copied block, the owner of the original data can enter the appropriate digital signature into the security vault system 130. If the digital signature is entered correctly, access is granted to the copied block. If the digital signature is not entered correctly, access to the copied block is not granted.

At 514, the owner of the data verifies that the copied block contains the same data as block N. For example, the owner can compare the previous block hash 234, the block identifier 236, and the merkle root 238 located within the copy of block N with the information located in block N at the time the copy was created. If the information matches, the owner has verified that the data in the copied block contains the same data as block N.

In arrangements where the security vault contains a hash of block N instead of a copy of block N, the data can be verified by comparing the hash of block N with the hash stored in the security vault. For example, the user can compare the hash of block N with the hash stored in security vault A 272. If the hashes are identical, the data contained in block N can be verified.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method for securing data located in a blockchain having a plurality of blocks, the method comprising:
    creating a pointer within a block of the plurality of blocks, the pointer pointing to a location external to the blockchain; and
    in response to a request to protect data inside the block:
        creating a security vault at the location;
        copying the block; and
        storing the copied block in the security vault using the pointer.

2. The method of claim 1, wherein the block includes a header, and the pointer is located within the header.

3. The method of claim 1, wherein the copied block is stored in at least one additional security vault.

4. The method of claim 3, wherein the at least one additional security vault is located in one or more of a different geographic location, a location with different regulatory requirements, or a location with different legal requirements as compared to the security vault.

5. The method of claim 1, wherein the security vault is secured using at least one digital signature algorithm.

6. The method of claim 5, wherein the at least one digital signature algorithm is configured to be modified.

7. The method of claim 6, wherein the at least one digital signature algorithm is a plurality of digital signature algorithms and each digital signature algorithm of the plurality of digital signature algorithms comprises at least one of a different asymmetric key, a different key length, a different algorithm parameter, or a different hash.

8. A system for securing data located in a blockchain having a plurality of blocks, the system comprising:
    a processing circuit including a processor and a memory storing instructions thereon that, when executed by the processor, cause the processor to:
    create a pointer within a block of the plurality of blocks, the pointer pointing to a location external to the blockchain; and
    in response to a request to protect data inside the block:
        create a security vault at the location;
        copy the block; and
        store the copied block in the security vault using the pointer.

9. The system of claim 8, wherein the block includes a header, and the pointer is located within the header.

10. The system of claim 8, wherein the copied block is stored in at least one additional security vault.

11. The system of claim 10, wherein the at least one additional security vault is located in one or more of a different geographic location, a location with different regulatory requirements, or a location with different legal requirements as compared to the security vault.

12. The system of claim 8, wherein the security vault is secured using at least one digital signature algorithm.

13. The system of claim 12, wherein the at least one digital signature algorithm is configured to be modified.

14. The system of claim 13, wherein the at least one digital signature algorithm is a plurality of digital signature algorithms and each digital signature algorithm of the plurality of digital signature algorithms comprises at least one of a different asymmetric key, a different key length, a different algorithm parameter, or a different hash.

15. One or more non-transitory computer-readable media having instructions stored thereon that, when executed by at least one processing circuit, cause the at least one processing circuit to:
    create a pointer within a block of a plurality of blocks on a blockchain, the pointer pointing to a location external to the blockchain; and
    in response to a request to protect data inside the block:
        create a security vault at the location;
        copy the block; and
        store the copied block in the security vault using the pointer.

16. The one or more non-transitory computer-readable media of claim 15, wherein the block includes a header, and the pointer is located within the header.

17. The one or more non-transitory computer-readable media of claim 15, wherein the copied block is stored in at least one additional security vault.

18. The one or more non-transitory computer-readable media of claim 15, wherein the security vault is secured using at least one digital signature algorithm.

19. The one or more non-transitory computer-readable media of claim 18, wherein the at least one digital signature algorithm is configured to be modified.

20. The one or more non-transitory computer-readable media of claim 19, wherein the at least one digital signature algorithm is a plurality of digital signature algorithms and each digital signature algorithm of the plurality of digital signature algorithms comprises at least one of a different asymmetric key, a different key length, a different algorithm parameter, or a different hash.

* * * * *